(12) United States Patent
Hasler et al.

(10) Patent No.: US 11,794,276 B2
(45) Date of Patent: Oct. 24, 2023

(54) PORTABLE LASER CUTTER

(71) Applicant: RENDYR, INC., Blacksburg, VA (US)

(72) Inventors: Kaelum Hasler, Blacksburg, VA (US);
Martin Angst, Blacksburg, VA (US);
Reid Holbert, Blacksburg, VA (US);
Bradley Turner, Toano, VA (US)

(73) Assignee: RENDYR, INC., Blacksburg, VA (US)

( * ) Notice: Subject to any disclaimer, the term of this patent is extended or adjusted under 35 U.S.C. 154(b) by 379 days.

(21) Appl. No.: 17/277,331

(22) PCT Filed: Sep. 17, 2019

(86) PCT No.: PCT/US2019/051420
§ 371 (c)(1),
(2) Date: Mar. 18, 2021

(87) PCT Pub. No.: WO2020/060981
PCT Pub. Date: Mar. 26, 2020

(65) Prior Publication Data
US 2021/0346982 A1  Nov. 11, 2021

Related U.S. Application Data

(60) Provisional application No. 62/789,046, filed on Jan. 7, 2019, provisional application No. 62/733,390, filed on Sep. 19, 2018.

(51) Int. Cl.
*B23K 26/00* (2014.01)
*B23K 26/08* (2014.01)
*B23K 26/38* (2014.01)

(52) U.S. Cl.
CPC ...... *B23K 26/0096* (2013.01); *B23K 26/0876* (2013.01); *B23K 26/38* (2013.01)

(58) Field of Classification Search
CPC ............ B23K 2101/18; B23K 26/0096; B23K 26/0876; B23K 26/38; B23K 37/0235;
(Continued)

(56) References Cited

U.S. PATENT DOCUMENTS

| 3,828,159 A | 8/1974 | Zoot |
| 4,067,555 A | 1/1978 | Vignardet et al. |

(Continued)

OTHER PUBLICATIONS

Jan. 3, 2020 International Search Report issued in International Patent Application No. PCT/US2019/051420.
(Continued)

*Primary Examiner* — Dana Ross
*Assistant Examiner* — Joseph W Iskra
(74) *Attorney, Agent, or Firm* — Oliff PLC

(57) ABSTRACT

A CNC machine includes a lower body; an upper body that extends from the lower body and is movably attached to the lower body; a tool that is movably attached to the upper body; and a flexible mat that is attached to the lower body. The tool may be a laser generator with the flexible mat resistant to the laser beam. The flexible mat has at least one orientation such that an outer periphery of the flexible mat is greater than the full extent of range of motion of the tool. The upper body may be connected to the lower body by a pivot mechanism configured to allow the upper body to pivot from a first position to a second position and to rotationally fix the upper body relative to the lower body in the second position, with the first and second positions being ninety degrees apart.

14 Claims, 17 Drawing Sheets

(58) Field of Classification Search
CPC ...... B23K 37/0408; B26D 7/20; B44B 3/006;
B44B 3/009
USPC .................................................. 219/121.67
See application file for complete search history.

(56) References Cited

U.S. PATENT DOCUMENTS

| | | |
|---|---|---|
| 4,672,172 A | 6/1987 | Pearl |
| 4,760,583 A | 7/1988 | Sasnett et al. |
| 4,985,780 A | 1/1991 | Garnier et al. |
| 6,462,301 B1 | 10/2002 | Scott et al. |
| 8,525,067 B2 | 9/2013 | Muscat-Tyler et al. |
| 9,266,198 B1 | 2/2016 | Snead |
| 9,446,472 B2 | 9/2016 | Winn et al. |
| 2004/0178181 A1 | 9/2004 | Leibinger et al. |
| 2005/0280488 A1 | 12/2005 | Devine |
| 2007/0035777 A1 | 2/2007 | Kintner |
| 2013/0087537 A1 | 4/2013 | Barnett et al. |
| 2016/0059363 A1* | 3/2016 | Ardisson .............. B23K 26/032 219/121.67 |
| 2017/0303668 A1* | 10/2017 | Kesler ....................... A45F 4/02 |
| 2018/0147657 A1 | 5/2018 | Shapiro |
| 2018/0161938 A1 | 6/2018 | Cathry et al. |
| 2019/0324574 A1* | 10/2019 | Schooley .............. G06F 1/1632 |

OTHER PUBLICATIONS

Mar. 23, 2021 International Preliminary Report on Patentability issued in International Patent Application No. PCT/US2019/051420.

\* cited by examiner

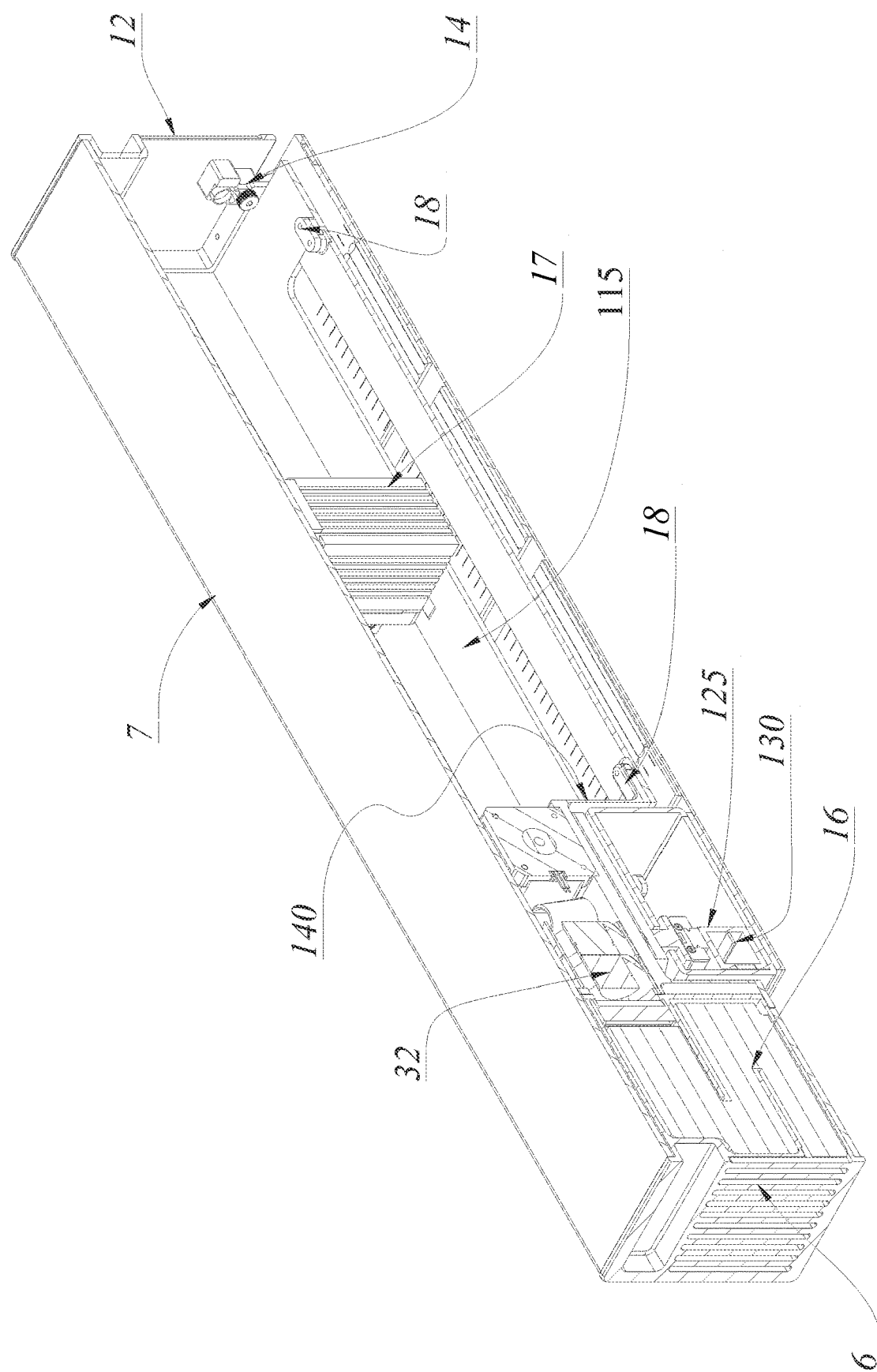

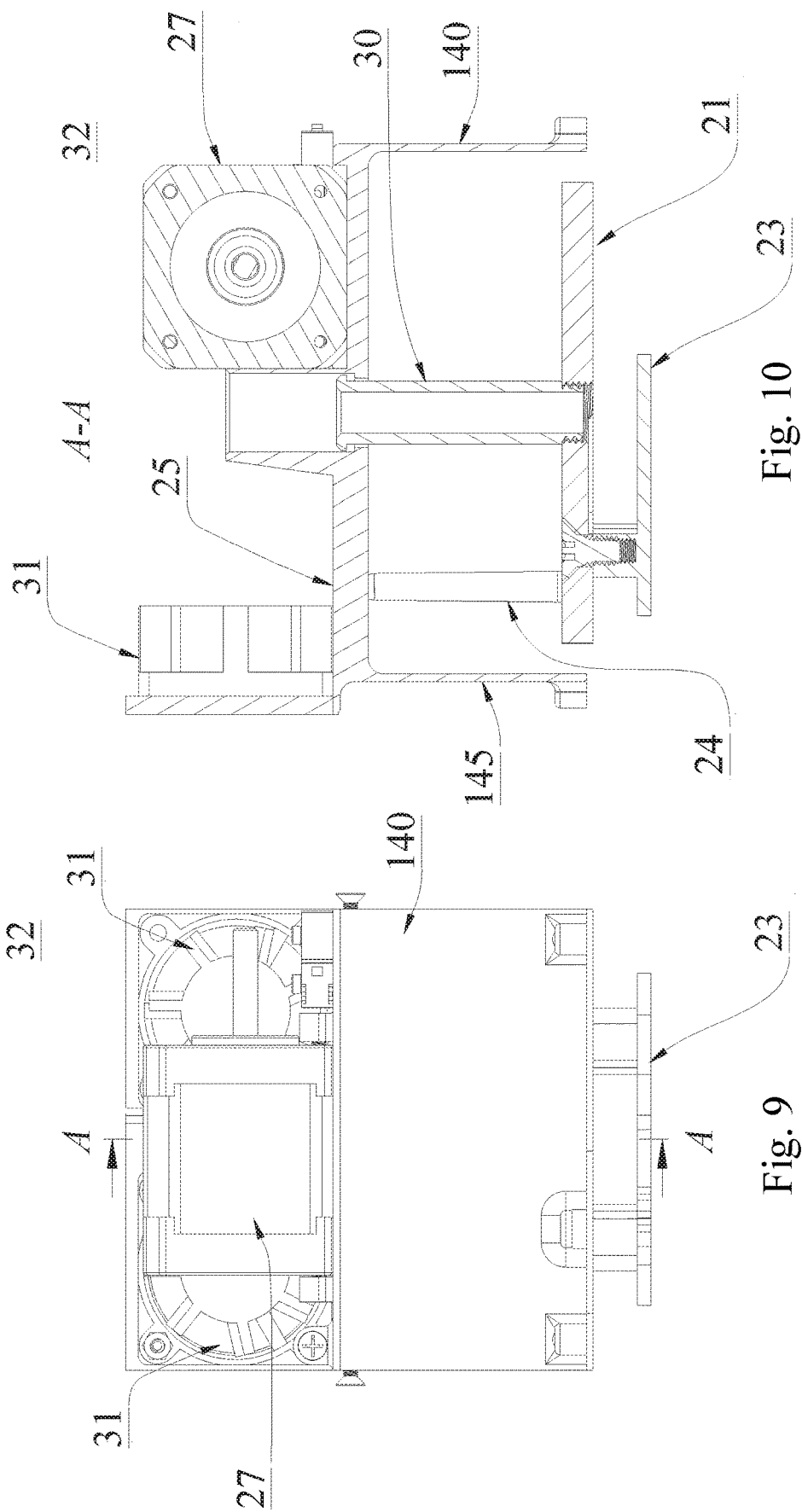

(12) United States Patent

PORTABLE LASER CUTTER

CROSS-REFERENCES TO RELATED APPLICATIONS

This application is the national phase of PCT/US2019/051420, filed Sep. 17, 2019 and claims priority to U.S. provisional application 62/789,046 filed Jan. 7, 2019 and U.S. provisional application 62/733,390 filed Sep. 19, 2018, each of which is hereby incorporated by reference in its entirety.

BACKGROUND & SUMMARY

Laser cutting is a technology that uses a laser to cut materials, and is typically used for industrial manufacturing applications, but is also starting to be used by schools, small businesses, and hobbyists. Laser cutting works by directing the output energy of a laser toward material to be cut, most commonly through optics. The laser optics and CNC (computer numerical control) are used to direct the material or the laser beam generated. A commercial laser for cutting materials involves a motion control system to follow a CNC or G-code of the pattern to be cut onto the material. The focused laser beam is directed at the material, which then either melts, burns, or vaporizes, and if necessary is blown away by a jet of gas, leaving an edge with a high-quality surface finish. Industrial laser cutters are used to cut flat-sheet material as well as structural and piping materials.

There are generally three different configurations of industrial laser cutting machines: moving material, hybrid, and flying optics systems. These refer to the way that the laser beam is moved over the material to be cut or processed. For all of these, the axes of motion are typically designated X and Y axis. If the distance of the cutting head from the material may be controlled, it is designated as the Z-axis.

Moving material lasers have a stationary cutting head and move the material under it. This method provides a constant distance from the laser generator to the workpiece and a single point from which to remove cutting effluent. It requires fewer optics, but requires moving the workpiece. This style machine tends to have the fewest beam delivery optics, but also tends to be the slowest.

Hybrid lasers provide a table which moves in one axis (usually the X-axis) and moves the head along the shorter (Y) axis. This results in a more constant beam delivery path length than a flying optic machine and may permit a simpler beam delivery system. This can result in reduced power loss in the delivery system and more capacity per watt than flying optics machines.

Flying optics lasers feature a stationary table and a cutting head (with laser beam) that moves over the workpiece in both of the horizontal dimensions. Flying optics cutters keep the workpiece stationary during processing and often do not require material clamping. The moving mass is constant, so dynamics are not affected by varying size of the workpiece. Flying optics machines are the fastest type, which is advantageous when cutting thinner workpieces.

Most laser cutting machines suitable for hobby applications utilize a flying optic approach because it allows the moving mass to be light and consistent.

Conventional laser cutters may use a mechanism to cut material, often a sheet of material, on a large horizontal vacuum table in an enclosed housing, and may or may not require the material to move. Such laser cutters require the material to be held flat against the cutting surface so that the produced cuts are not warped, tapered, or otherwise out of specification. Most non-metal surfaces used as a cutting surface are roughened or marred, which may cause the material being cut to not lie flat on the cutting surface.

Conventional laser cutters may employ a honeycomb (or right angle grid, diagonal grid, etc.) metal cutting surface that allows energy from the laser beam to pass through the honeycomb, which helps to prevent the cutting surface from being roughened or marred. But the honeycomb surfaces cannot be reversibly folded or bent and thus laser cutters employing such surfaces generally cannot be smaller than the profile being cut. The profile of such conventional laser cutters makes them difficult to transport and use in nonindustrial settings.

Conventional laser cutting devices (see, e.g., US 2016/0059363 A1) may allow for larger profiles of material to be cut by employing a folding arm mechanism and unenclosed laser cutter. However, such devices create risks for eye damage and fume inhalation for users and do not adequately address the need for a flat, transportable cutting surface Laser cutting devices differ from other cutting devices where a tool contacts the material being cut (such as a CNC mill) in that the act of cutting with a laser does not impart forces onto the beam emitter that could cause a deflection of the beam emitter. Thus a laser cutting device may utilize a structure that is relatively less rigid while maintaining similar or greater accuracy when cutting as compared to a cutting device where a tool contacts the material being cut.

Commercially available laser cutting machines are presently about the size of a washing machine, which is too large or cumbersome to be considered portable. Such laser cutting machines are also disadvantageous because they require access to ventilation to handle the fumes generated by the laser cutter. Such laser cutting machines are also disadvantageous because they require the working material to be placed inside of an enclosure of the cutting machine, which limits the size and types of working material.

At least one embodiment of the present technology solves these and other problems of known laser cutting machines.

An example of the present technology provides a laser device with a foldable cutting mat.

In particular, a laser device comprises a lower body; an upper body that extends from the lower body and is movably attached to the lower body; a beam emitter that is movably attached to the upper body and is configured to generate a laser beam; and a flexible mat that is attached to the lower body. The flexible mat is resistant to the laser beam, and the flexible mat is configured such that in at least one orientation of the flexible mat, an outer periphery of the flexible mat is greater than the full extent of range of motion of the beam emitter.

In examples, (a) the flexible mat is flat in a first configuration and at least partially wrapped around the lower body and the upper body in a second configuration; (b) the lower body comprises a magnetic element and the flexible mat is configured to magnetically attach to the magnetic element in the second configuration; (c) the flexible mat substantially conforms to one or more exterior surfaces of the lower body in the second configuration; (d) the flexible mat comprises a straight edge that is raised relative to an adjacent portion of the flexible mat and configured to abut a peripheral edge of material placed on the flexible mat; (e) the straight edge is parallel to a direction in which the upper body is movably attached to the lower body; (f) the flexible mat comprises a surface finish that reduces laser reflectance; (g) the flexible mat comprises hinges configured to allow the flexible mat to fold along a predetermined line; (h) the flexible mat includes a first layer with a plurality of adjacent sheets of laser resistant material, wherein the first layer is closest to the beam emitter in the at least one orientation; and a second layer that is more flexible than the first layer, wherein the second layer connects each pair of adjacent sheets of laser resistant material together to form a living hinge; (i) the cutting mat includes a third layer such that the second layer is sandwiched between the third layer and the first layer, the third layer being softer than the first layer and the second layer; (j) the third layer is felt; (k) the first layer is aluminum and the second layer is steel; (l) the first layer is steel and the second layer is carbon fiber; (m) the first layer comprises a surface finish that reduces laser reflectance, and reduces conductive heat transfer between the first layer and material placed on the first layer to be cut by the beam emitter; and/or (n) the flexible mat comprises a sheet of flexible polymer connecting the flexible mat to the lower body.

An example of the present technology provides a CNC machine, e.g., a laser cutting machine, that can be collapsed into a smaller footprint.

In particular, a CNC machine comprises a lower body; an upper body that is connected to the lower body and is movable with respect to the lower body along a first linear direction; a tool that is attached to the upper body and is movable with respect to the upper body along a second linear direction; and a pivot mechanism that connects the upper body to the lower body. The pivot mechanism is configured to allow the upper body to pivot from a first position to a second position and to rotationally fix the upper body relative to the lower body in the second position, the first linear direction and the second linear direction are parallel in the first position, and the first linear direction and the second linear direction are perpendicular in the second position.

In examples, (a) the pivot mechanism is configured to provide translational movement between the lower body and the upper body, the translational movement being perpendicular to both the first linear direction and the second linear direction; (b) a full extent of the translational movement is possible only when the upper body is in the second position; (c) the pivot mechanism includes a first plate and a second plate that are parallel to one another, and a pivot pin that allows the first plate and the second plate to pivot with respect to one another about an axis of the pivot pin and to translate relative to one another along the pivot pin; (d) the pivot mechanism comprises a second pin fixed to the first plate and a hole in the second plate that aligns with the second pin when the upper body is in the second position; (e) the second pin cooperates with the second plate to prevent the first plate and the second plate from translating relative to one another along the pivot pin except when the upper body is in the second position; (f) the pivot mechanism comprises two of the second pin and two of the hole in the second plate; (g) the CNC machine includes a third plate and a fourth plate that are parallel to one another, fixed to the second plate, and extending away from the second plate and beyond at least a portion of the first plate, and the first plate includes two pairs of parallel sides and two opposed rounded corners such that the first plate cooperates with the third plate and the fourth plate so that relative rotation between the first plate and the second plate does not extend substantially beyond the first position or the second position; and/or (h) the CNC machine includes a third plate fixed to and extending away from the second plate and beyond at least part of the first plate, and the first plate includes two sides that are at a right angle with respect to one another and a rounded corner between the two sides such that the first plate cooperates with the third plate so that relative rotation between the first plate and the second plate does not extend substantially beyond the first position or the second position.

An example of the present technology provides a laser cutting machine with integrated fume filtration.

In particular, a laser device includes a lower body; a mat that is attached to the lower body; an upper body that extends from the lower body over the mat and is movably attached to the lower body; an enclosure between the upper body and the mat and including an opening that faces towards the mat; a beam emitter that is movably attached to the upper body and within the enclosure, wherein the beam emitter is configured to emit a laser beam from the enclosure toward the mat; and a filtration system with a filter, wherein the filtration system is configured to drawn air from the enclosure and pass the air through the filter.

In examples, (a) a total area of the opening is smaller than a total area of the mat; (b) at least one wall of the enclosure acts as an optical filter at a frequency of the laser beam; (c) the enclosure is fixed relative to the beam emitter; and/or (d) the enclosure is fixed relative to the upper body An example of the present technology provides a laser cutting machine that can be transported to, and placed on, the working material. This may allow, for example, large surfaces to be laser cut or engraved, including surfaces that are impractical to transport to a laser cutting device.

Other aspects, features, and advantages of this technology will become apparent from the following detailed description when taken in conjunction with the accompanying drawings, which are a part of this disclosure and which illustrate, by way of example, principles of this technology.

BRIEF DESCRIPTION OF THE DRAWINGS

FIG. 4 is a perspective view of the section taken along line A-A of FIG. 2.

FIG. 9 is a side view of a hinge mechanism with various components attached.

FIG. 10 is a section taken along line A-A of FIG. 9.

DETAILED DESCRIPTION

The following description is provided in relation to several examples which may share common characteristics and features. It is to be understood that one or more features of any one example may be combinable with one or more features of the other examples. In addition, any single feature or combination of features in any of the examples may constitute additional examples.

Figure 1:
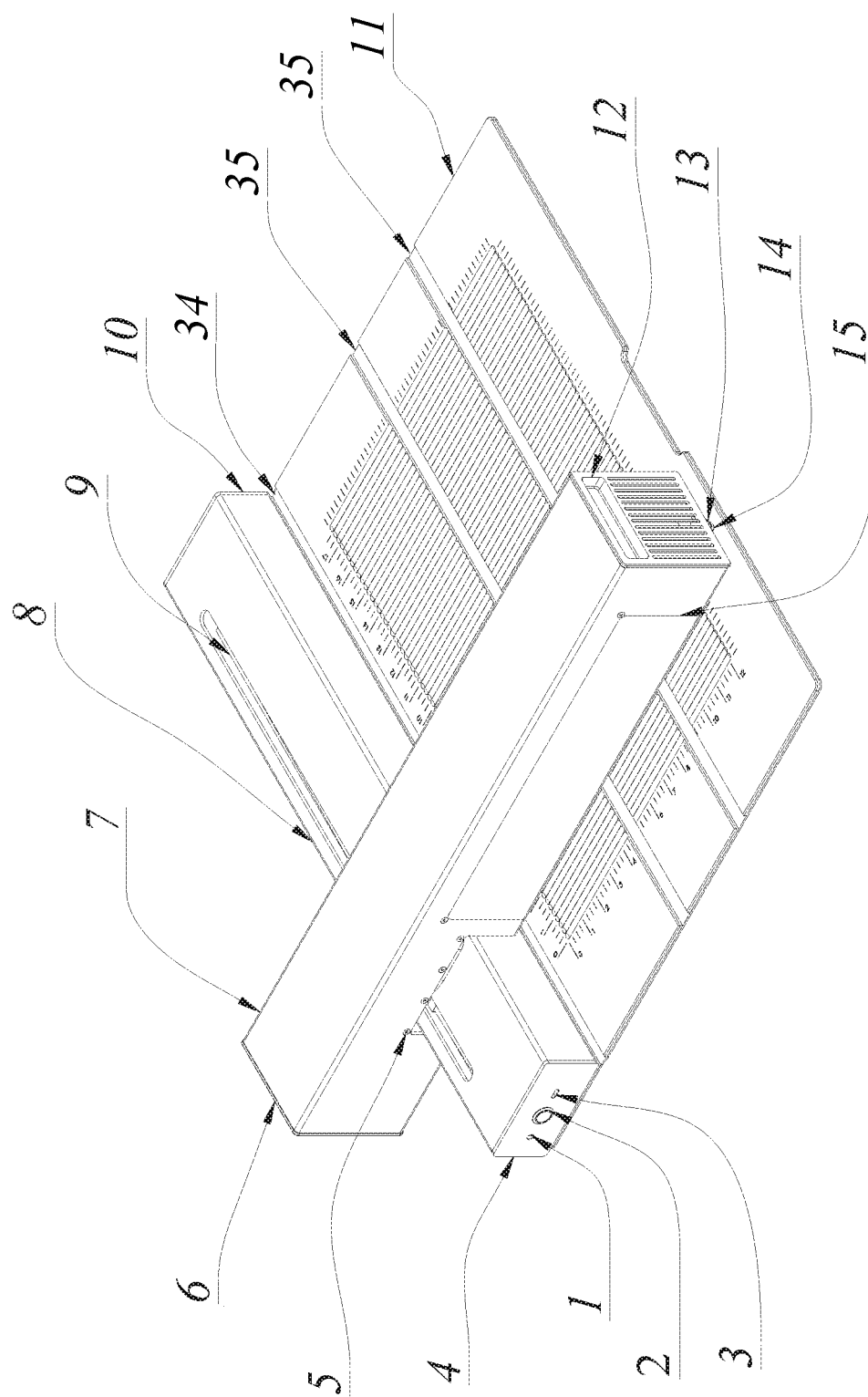
FIG. 1 is a perspective view of a laser cutting machine in an unfolded state.
Figure 5:
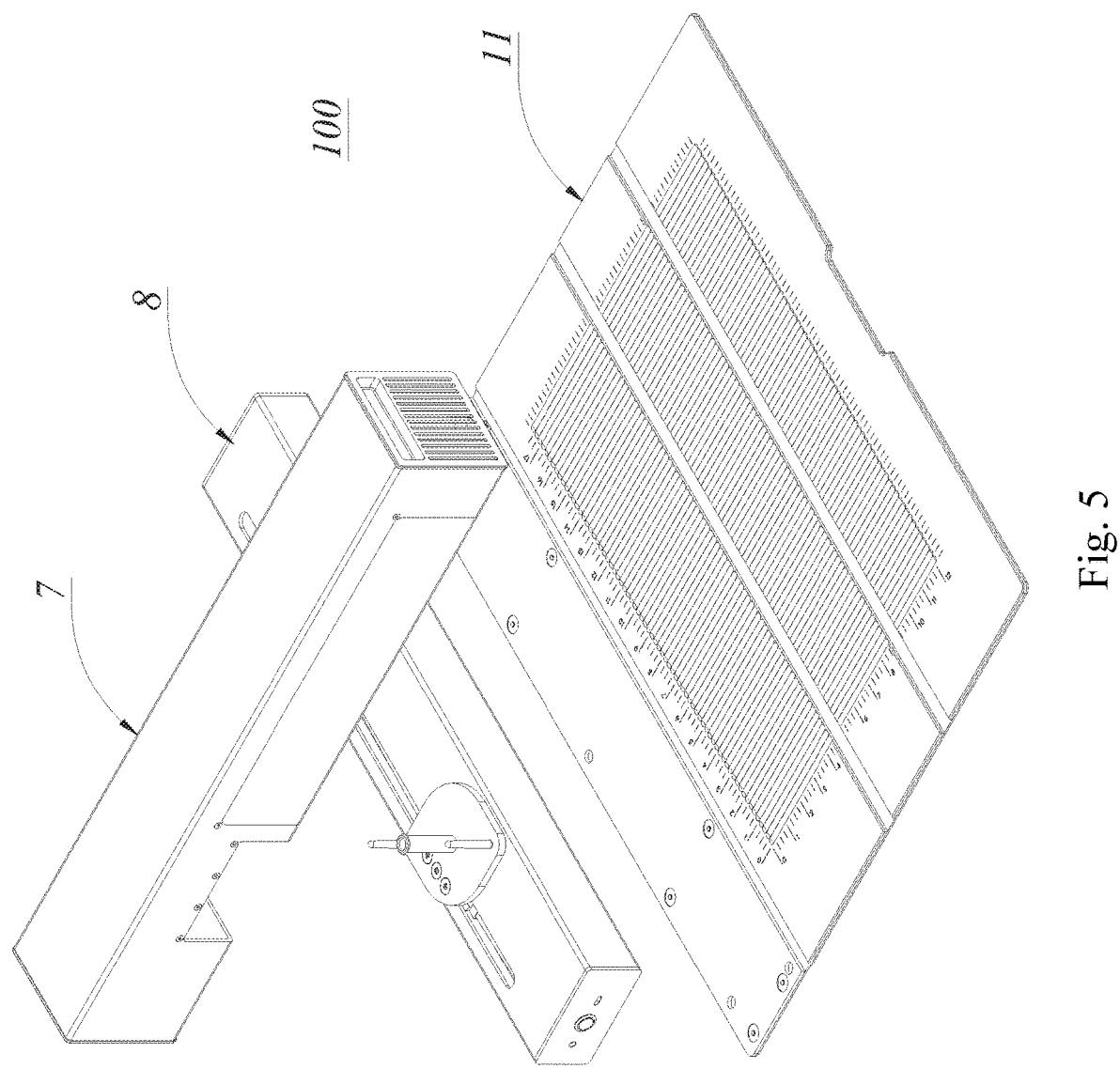
FIG. 5 is an exploded view of a laser cutting machine.

FIG. 1 is a perspective view of a CNC machine (e.g., a laser cutting machine 100) according to the present technology, with three major components: an upper body (or arm) 7, a lower body (or base) 8 and a cutting mat (or bed) 11. Each of these elements are separately visible in FIG. 5. In FIG. 1, the laser cutting machine 100 is in an unfolded (i.e., operational) state such that the cutting mat 11 is in an unfolded or flat state and the upper body 7 is turned 90 degrees from the lower body 8 and in a locked position that provides perpendicularity between the upper body 7 and the lower body 8. This unfolded state is the operating state of the laser cutting machine 100. The lower body includes a DC power input 1, a power button 2, and a data port (e.g., USB-C port) 3 within an end cap 4 over a control board end of the lower body 8. The opposite end includes another end cap 10 covering a stepper motor.

Figure 19:
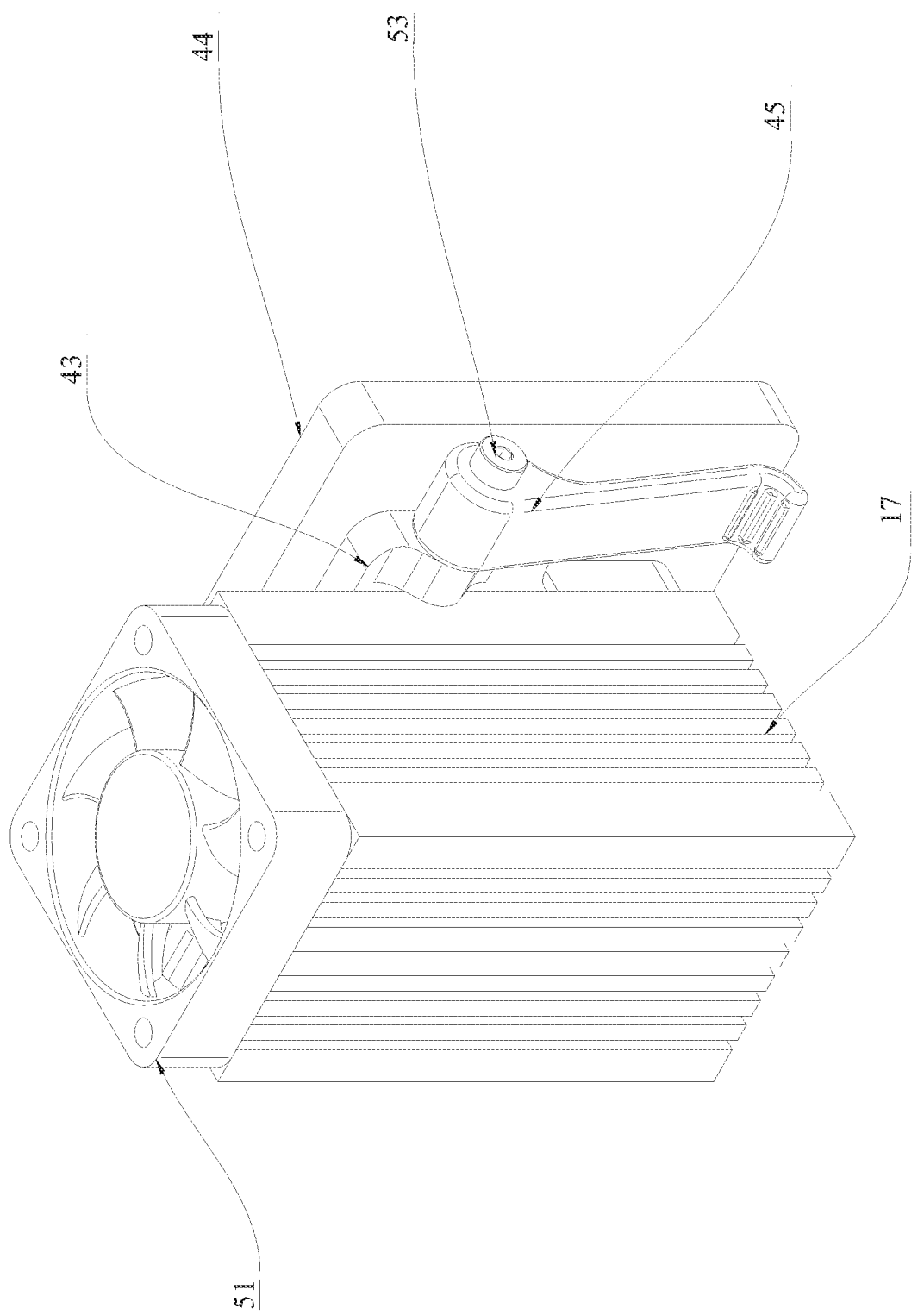
FIG. 19 is a perspective view of a laser module and mounting components.

Each of the upper body 7 and the lower body 8 includes a respective linear axis. The lower body 8 includes a linear axis 9, which functions as a y-axis. Inside the upper body 7 is a linear axis in the form of a tracking belt 50 (visible in FIG. 3, which functions as the x axis) that moves the laser module (or beam emitter) 17. The laser module 17 may be adjusted along a z-axis (i.e., perpendicular to the x-axis and y-axis) by way of a manual adjustment mechanism. The manual adjustment mechanism includes a first plate 43 and a second plate 44 that are attached to one another so they can slide relative to each other in the z-axis and be locked relative to each other by way of an eccentric thumb lever 45 as illustrated in FIG. 19.

The upper body 7 includes a laser shield 15 that may be held in place via attachments 18 (two of which are illustrated in FIG. 4), which are preferably magnetic attachments. The laser shield 15 may be completely opaque (e.g., made of metal) but it may be preferable for the laser shield 15 to act as a filter at a frequency of the laser beam emitted by the laser module 17. In this way, a user can view the laser cutting process, and the resultant changes to material being acted upon by the laser, without fear of visual impairment.

A laser cutting process may generate fumes, which may be unpleasant or unhealthy. In order to handle such fumes, the upper body 7 may include one or more air handling or filtration elements that form a filtration system. For example, the laser module 17 may include an integral or attached fan 51 as best seen in FIG. 19. Such a fan may serve a dual purpose of cooling the laser module and drawing fumes from immediately adjacent the laser cutting process and into the upper body 7—or the fan may be dedicated to fume evacuation only (i.e., no cooling of the laser module). The upper body 7 may also include one or more additional fans 31 (e.g., three) that draw the fumes from the body and discharge the fumes to a filter 6 (see FIG. 3). Thus the fans 31 may serve as a vacuum source that draws the fumes to the filter 6. Either an axial flow fan or a radial flow fan may be implemented for the fan 51, but a radial flow fan may be more advantageous because a radial flow fan may more readily direct the fumes towards the filter 6 when mounted as illustrated in FIG. 19.

Figure 20:
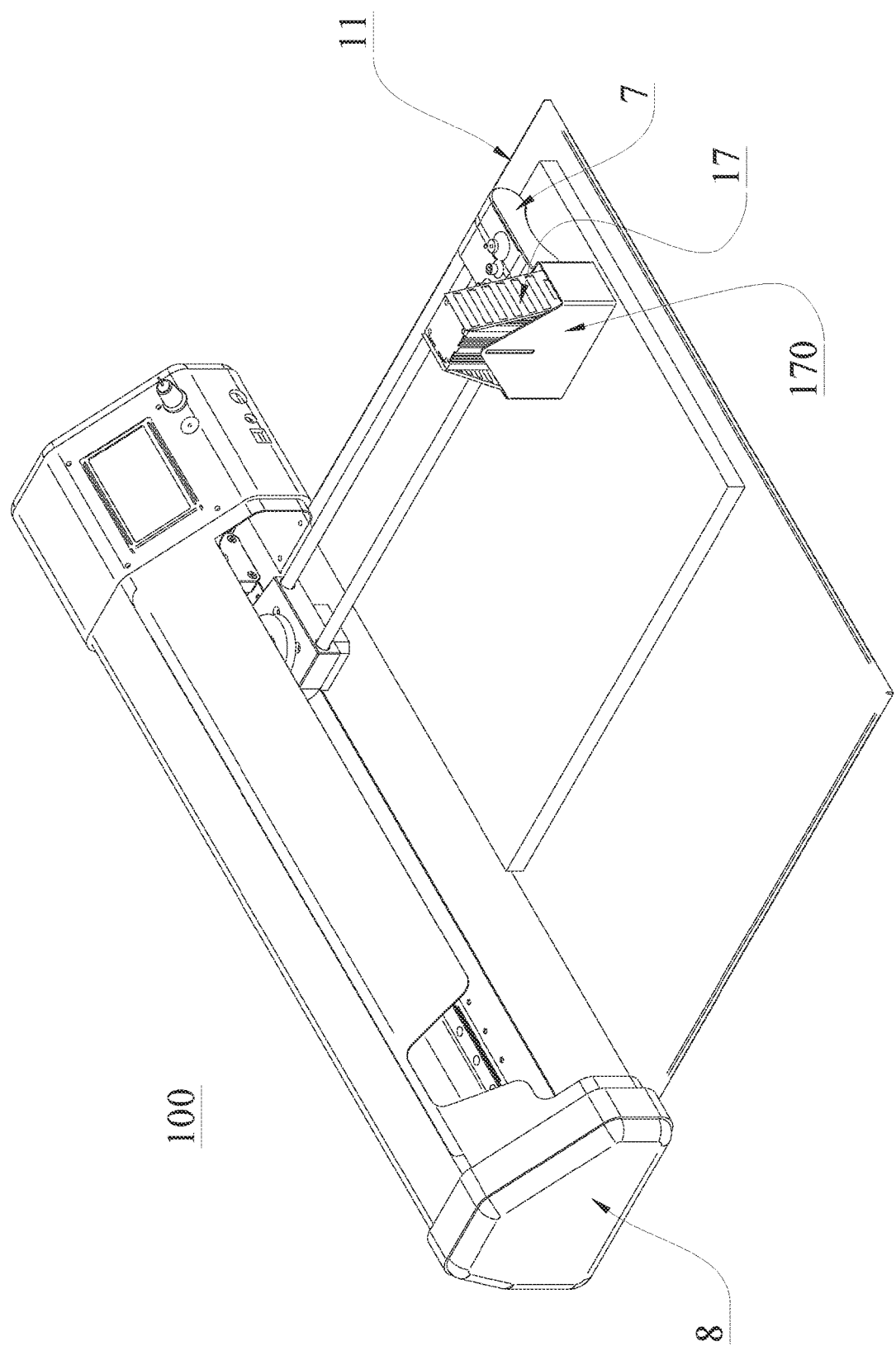
FIG. 20 is a perspective view of an alternative configuration of a laser cutting machine in an unfolded condition.

The upper body 7 includes an interior space 115 (see FIG. 3) such that the upper body 7 serves as an enclosure that allows for movement of the laser module 17 and evacuation of fumes. The enclosure provides fluid communication between the laser cutting process and the filtration system. In the embodiment illustrated in FIG. 3, the enclosure is formed by, and thus fixed relative to, the upper body 7 and thus the laser module 17 moves relative to the enclosure. In an alternative embodiment (see FIG. 20), the enclosure 170 may be fixed relative to the laser module 17, and thus the enclosure 170 moves relative to the upper body 7. In both embodiments, it is preferable that the enclosure be in close proximity to the material being operated upon to increase the likelihood that fumes will be successfully drawn to the filter 6. This embodiment may include a filter within the enclosure 170 or include a filter remote from the enclosure 170 but connected by a flow conduit with one or more fans to direct the fumes to the filter. Since the fumes are collected at or near the source in both embodiments and the total volume of the enclosure is relatively small, the filtration element may have a relatively reduced size as compared to known laser cutting systems. In laser cutting systems where the material to be cut is fully enclosed within the cutting system, the filter element is sized to filter the entire volume of the enclosed space. But with the present technology, the filter can have a smaller filtration capacity because the enclosed space is smaller.

Figure 13:
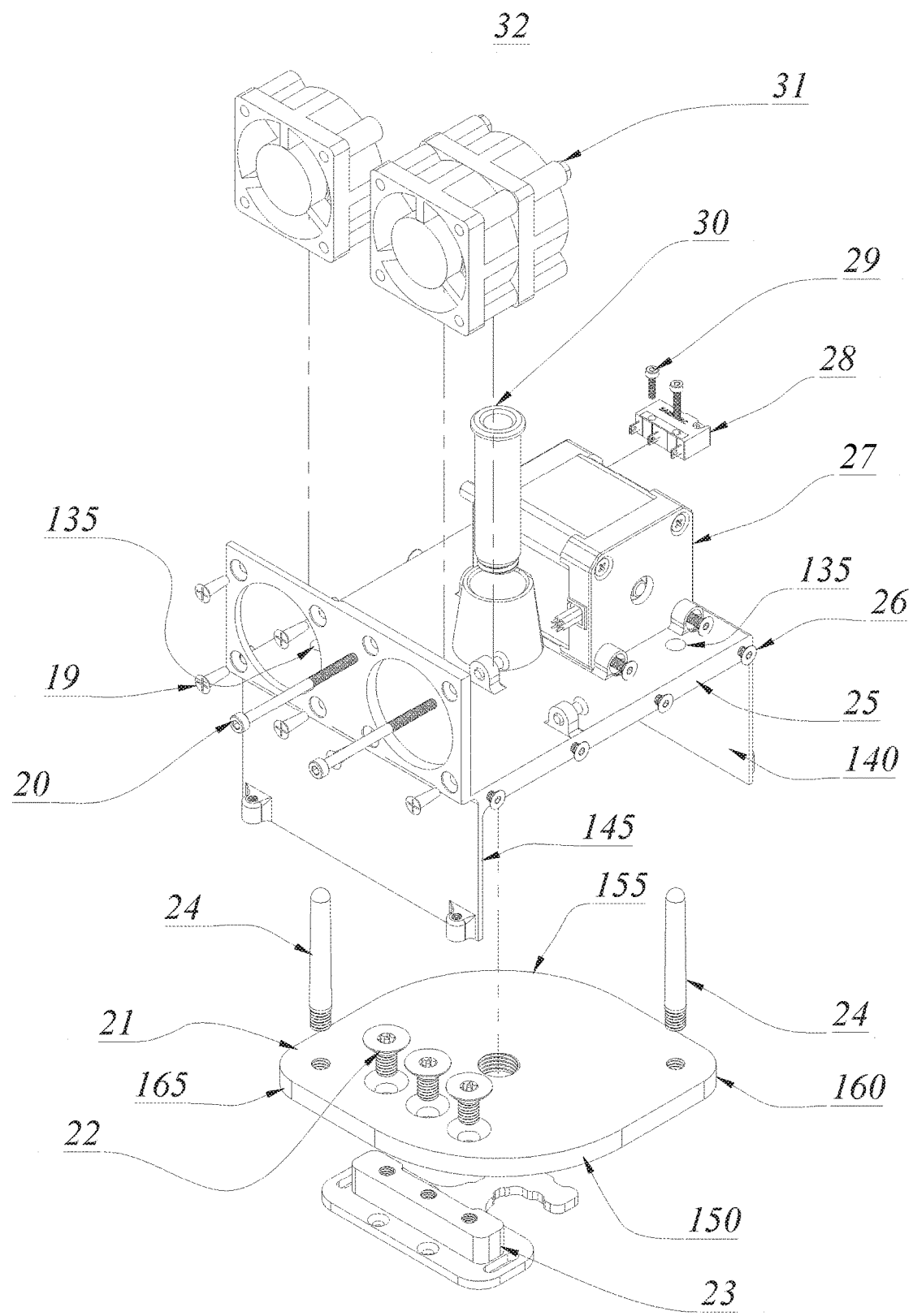
FIG. 13 is an exploded view of a hinge mechanism and various components that are attached to the hinge mechanism.
Figure 14:
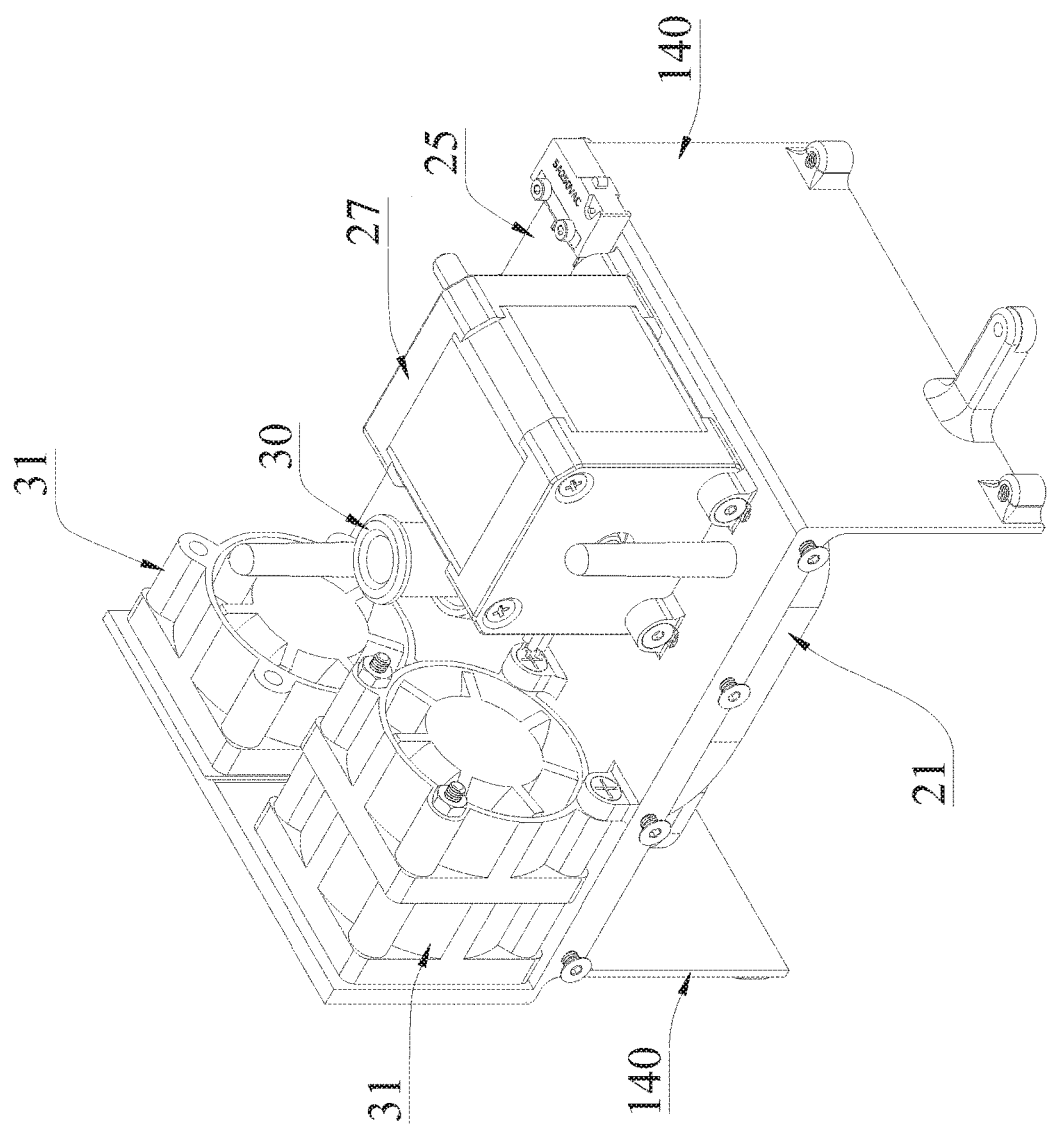
FIG. 14 is a perspective view of a hinge mechanism with various components attached to the hinge mechanism.
Figure 15:
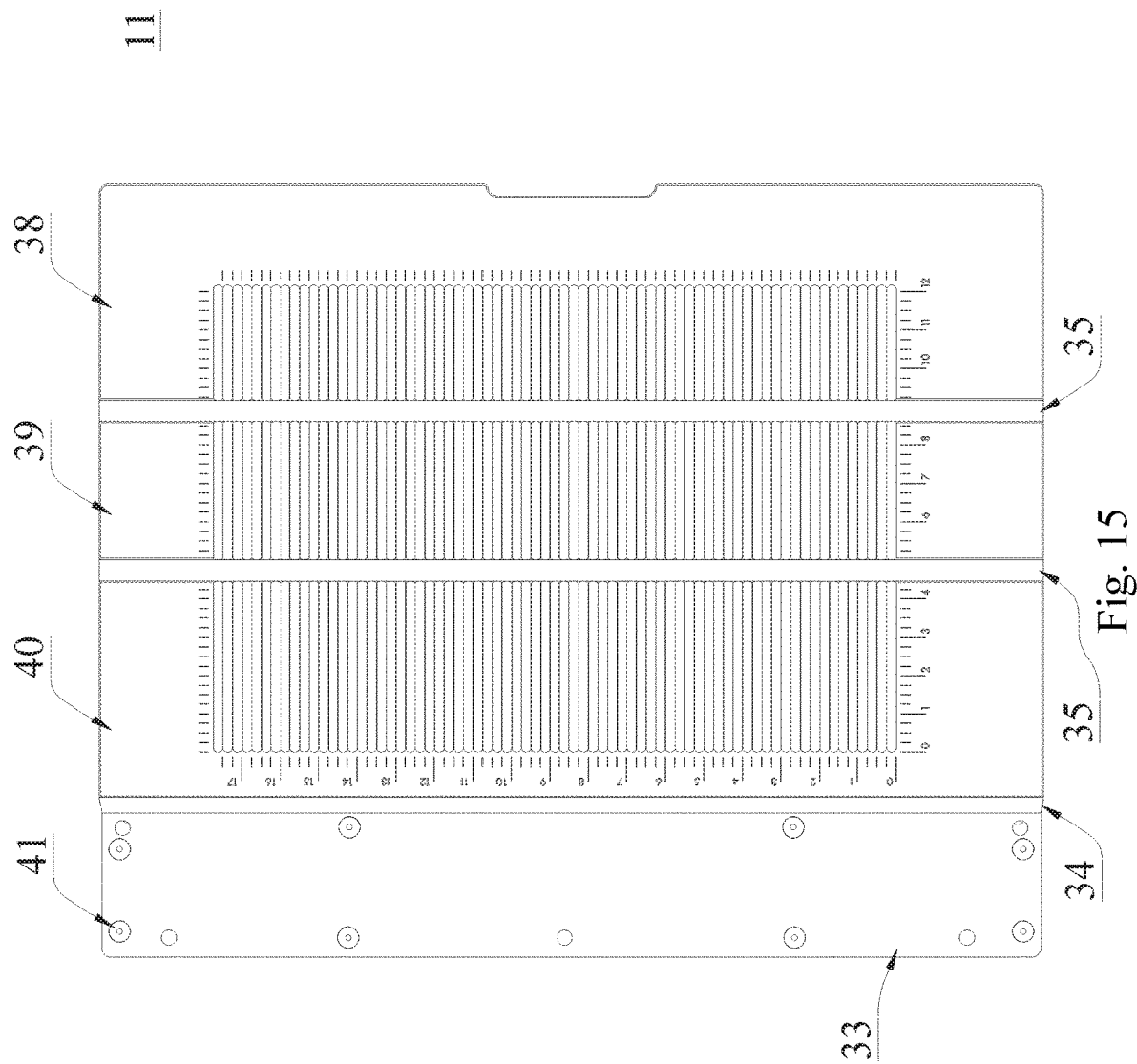
FIG. 15 is a top view of a cutting mat.
Figure 16:
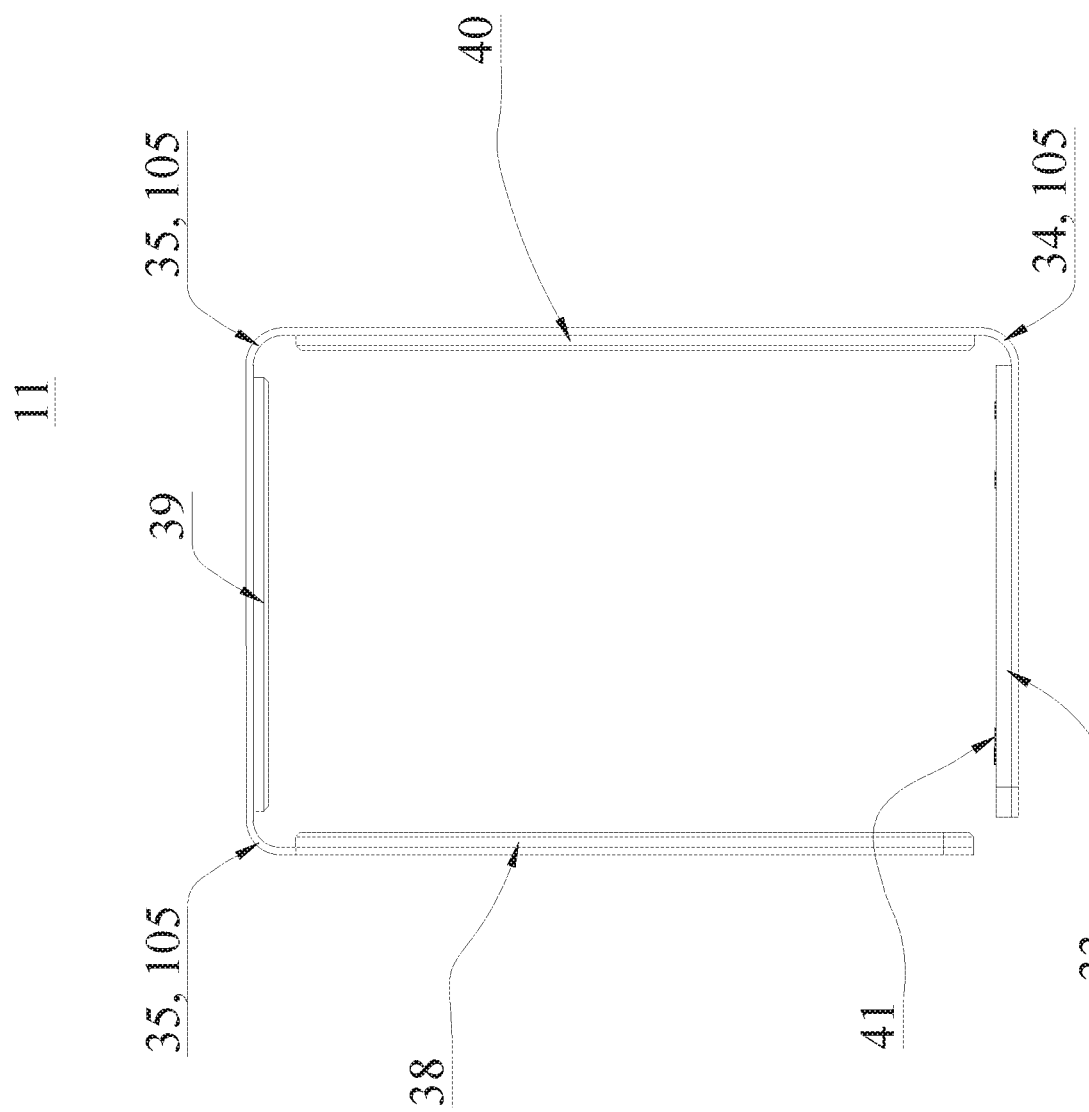
FIG. 16 is an end view of a cutting mat in a folded configuration with the laser cutting machine omitted.

As best seen in FIG. 13, the three fans 31 are arranged with two fans 31 arranged in series and a third in parallel with the two. This optional configuration may be useful in directing airflow through the interior space 115. With the illustrated configuration, a relatively higher amount of air will flow past the stepper motor 27 and thus additional cooling can be provided for the stepper motor 27.

Figure 3:
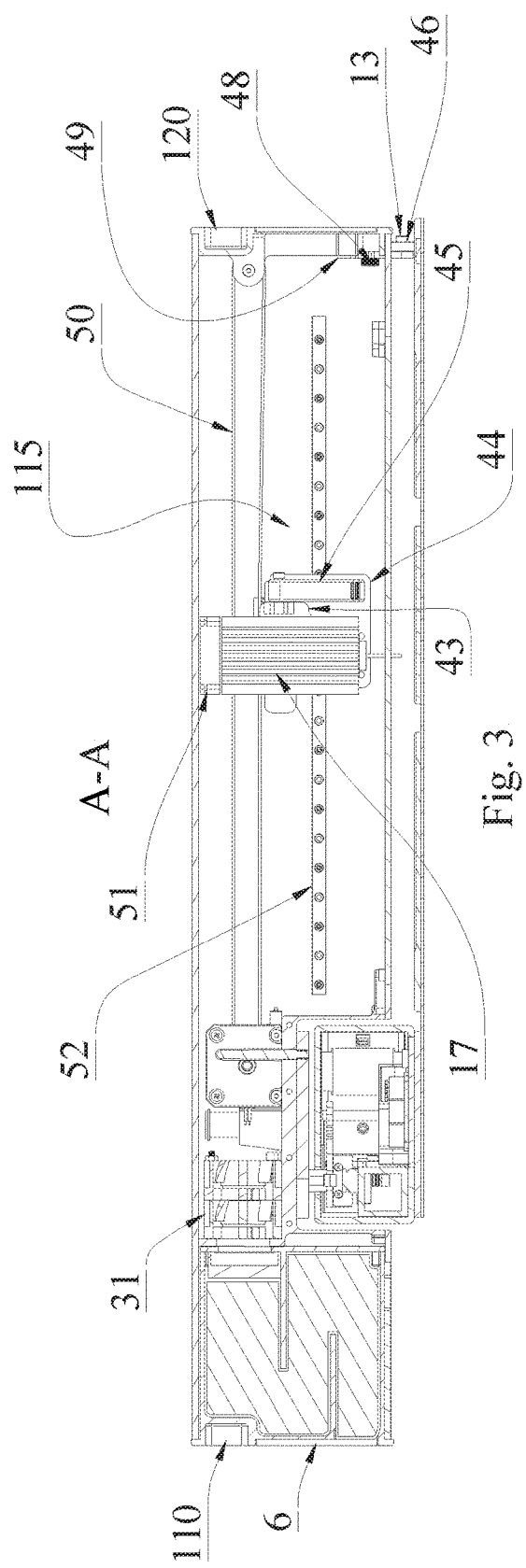
FIG. 3 is a section view of a laser cutting machine taken along line A-A of FIG. 2.
Figure 2:
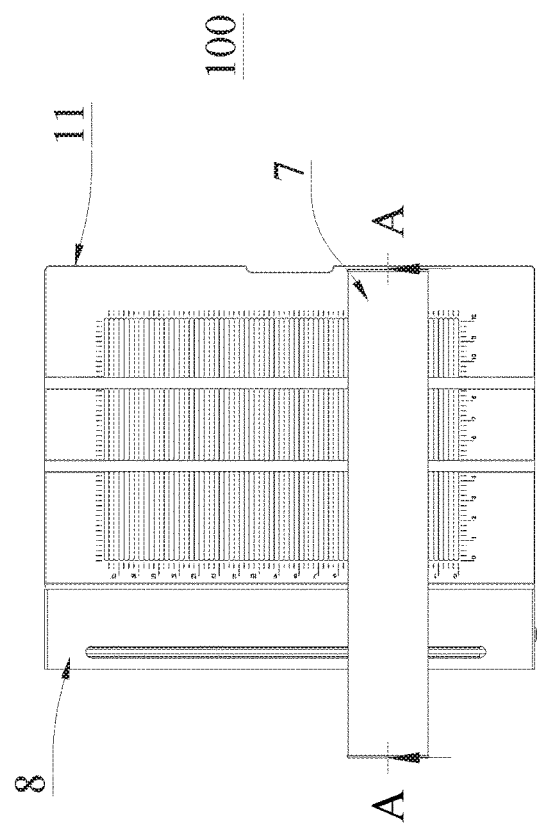
FIG. 2 is a top view of a laser cutting machine.

The upper body 7 includes a filter 6, preferably in the form of a removable cartridge, in fluid communication with the fans 31. Preferably, the flow path from the fans 31 to the outlet of the filter 6 is airtight. Any potential flow paths subject to over pressurization, e.g., between the fans 31 and the outlet of the filter 6, may be sealed with a gasket, a sealant or any other suitable sealing device. As can be seen in FIG. 3, the filter 6 may include a tortuous path so that the flow path can include a relatively greater length of filtration media in a given space. A handle 110 is incorporated into the filter, but can be omitted or included as a separate element from the filter 6.

On an opposite end of the upper body 7 from the filter is an endcap 12. The endcap 12 includes another handle 120, which may be omitted or a separate element from the endcap 12. Both of the handles 110, 120 allow the laser cutting machine to be lifted.

The filtration of the laser cutting fumes is an advantageous aspect of the laser cutting machine 100. Capturing the fumes immediately as they are created at the source, as opposed to conventional large volumetric filtration of the entirely enclosed machines, allows for relatively compact and efficient filtration design. This is similar to a dust shoe attachment on a CNC routing or milling machine: rather than letting chips fly all over the inside of the enclosure and having to vacuum every single surface, the dust shoe captures the dust right at the source and avoids the need for full enclosure of the entire machine. The filtration system described herein operates with similar efficiency.

The endcap 12 holds an internal idler mechanism 14, which is used to hold a tracking belt 50 under tension. The idler mechanism 14 is located at the bottom of the endcap 12 and includes two functional positions: a retracted position and an extended position. Gravity causes the idler leg 46 to extend downward when rotating the upper body 7 into the working position, where the idler leg can ride against the upper surface of the cutting mat 11. In the extended position, a magnetic lock 48 tends to keep the idler leg 46 in the extended position, and an idler bearing 13 is attached to the idler leg 46 by a bolt.

The lower body 8 houses the linear axis 9 as well as the control board and laser driver circuitry (which are conventional and omitted for simplicity). In an exemplary embodiment, the linear axis 9 may include a NEMA 17 40 mm stepper motor with a 5-1 planetary gearbox and a 40 tooth pulley, a linear track, idler bearing and associated mounting hardware, belt 130, linear bearing and motion riser. The linear track is affixed to a one inch square aluminum extrusion 125 and the belt 130 is tracked through it. Magnets are inset into machined pockets on the aluminum extrusion that match magnets 41 inset into the non-laser resistant plate 33 that underlies the lower body 8. The lower body motor moves the motion riser and linear bearing along a linear track.

The upper body 7 and the lower body 8 are connected by a hinge mechanism 32, which allows the upper body 7 and the lower body 8 to be rotated through a range of ninety degrees relative to one another. The end points of this range corresponds to an open (working) position and a closed (or folded) position.

Three main components of the hinge mechanism include the lower hinge plate 21, the upper hinge plate 25 and the central pin 30. In the closed position the two hinge plates are separated from one another (see FIG. 10) as the upper body 7 rests upon the lower body 8. The upper hinge plate 25 may also be in contact with the outer pin 24. In the open position (see FIG. 12) the lower hinge plate 21 and the upper hinge plate 25 abut one another—the top face of the lower hinge plate 21 is in full contact with the bottom face of the upper hinge plate 25. To move from the position of FIG. 10 to the position of FIG. 12, and vice versa, the upper hinge plate 25 and the lower hinge plate 21 move relative to each other along an axis of the central pin 30. In order to prevent over separation, the central pin may be fixed (e.g., threaded) to one plate (e.g., the lower hinge plate 21) and have an interference relationship with the other hinge plate (e.g., the upper hinge plate 25).

Figure 12:
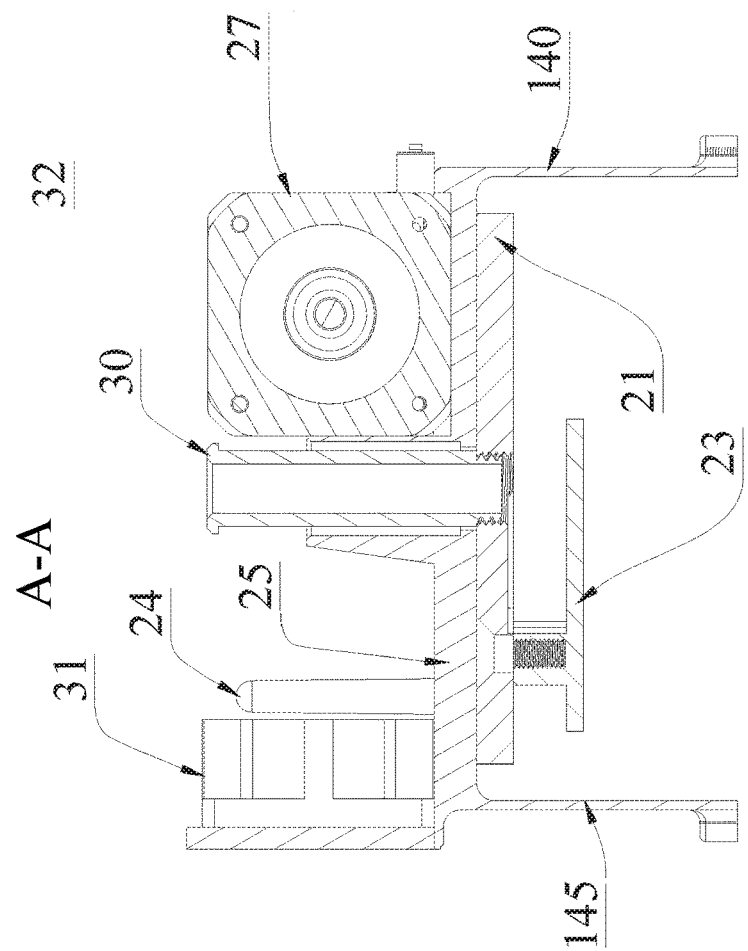
FIG. 12 is a section taken along line A-A of FIG. 11.
Figure 11:
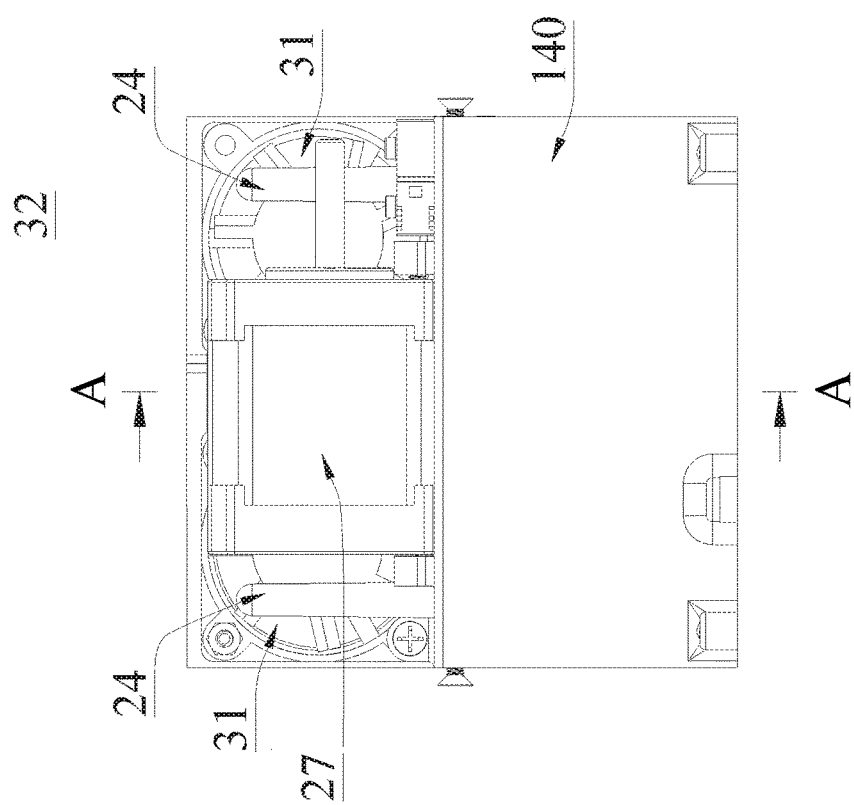
FIG. 11 is a side view normal to the view of FIG. 9.

FIG. 12 illustrates the unfolded and locked state of the hinge mechanism 32. The outer pin 24 mates with a hole 135 (see FIG. 13), and the size and tolerance of the outer pin 24 and hole 135 are selected to provide the desired positional accuracy of the upper body 7 relative to the lower body 8—precision in perpendicularity between the x-axis and the y-axis may increase accuracy of, or be necessary for, positional control of the laser module 17. Although two outer pins 24 are illustrated, there may be a single outer pin 24 or more than two may be provided.

The upper hinge plate 25 and lower hinge plate 21 may include additional features that may control or limit the range of relative motion between the two plates. For example, the upper hinge plate 25 may include a third plate 140 and a fourth plate 145 that are parallel and extend toward the lower hinge plate 21. The lower hinge plate 21 is substantially rectangular (i.e., two pairs of parallel sides where the pairs are perpendicular to one another) and includes opposed rounded corners. One set of opposed corners 150, 155 (a first rounded corner 150 and a second rounded corner 155) have a significantly larger radius of curvature than the other corners 160, 165 (a third rounded corner 160 and a fourth rounded corner 165). The corners 150, 155 allow sufficient clearance for the lower hinge plate 21 to be rotated from the first position to the second position while between the third plate 140 and the fourth plate 145. As can be seen at least in FIG. 10, sufficient clearance is present between the lower hinge plate 21 and the third plate 140 and the fourth plate 145 that the hinge mechanism 32 can experience at least some over rotation before interference will occur. Since some amount of over rotation can occur, but interference will eventually occur, the hinge mechanism can prevent rotation between the lower hinge plate 21 and the upper hinge plate 25 from extending substantially beyond the open and closed positions (e.g., 5° to 20° of over rotation). As will be appreciated, the clearance between the edges of the lower hinge plate 21 and the third plate 140 and the fourth plate 145, as well as the radius of the third rounded corner 160 and the fourth rounded corner 165, will determine the extent to which over rotation is controlled (if at all). Indeed, if the lower hinge plate 21 is round, 360° rotation will be possible.

The third plate 140 also may bound the flow path for fumes. For example, it will be appreciated from FIG. 4 that the third plate 140 bounds a portion of the interior space 115, and thus functions to route fumes toward the filter 6.

The hinge mechanism 32 may be applicable to any CNC machine that is foldable as described, not just a laser cutter. Thus the hinge mechanism 32 may be applied in other devices such as a 3-D printer or end mill that have two perpendicular axes of movement and where the ability to fold is desired. Of course, in such other applications of the hinge mechanism 32, the laser module 17 will be replaced by another tool such as a printer head or cutting tool.

As best seen in FIG. 13, the illustrated embodiment may also support the following components attached to the hinge mechanism 32: three fans 31, a stepper motor 27, a momentary limit switch 28, screws 19, screws 20, screws 26, and screws 29. The upper hinge plate 25 may be fabricated from any suitable material and process, although the illustrated configuration may be particularly suited to fabrication by a 3D printing process (e.g., plastic printing) because 3D printing can reduce wasted material. Casting or molding processes may achieve similar results.

The lower hinge plate 21 and central pin 30 may be fabricated from any suitable material, e.g., they may be machined from aluminum. The central pin 30 may be hollow (as illustrated) to provide for other components (such as a wiring harness, not illustrated) to be routed through the hinge mechanism 32 without interfering with movement of the hinge mechanism 32.

The lower hinge plate 21 may be attached to the linear axis 9 by way of a mounting bracket 23 and screws 22.

Figure 17:
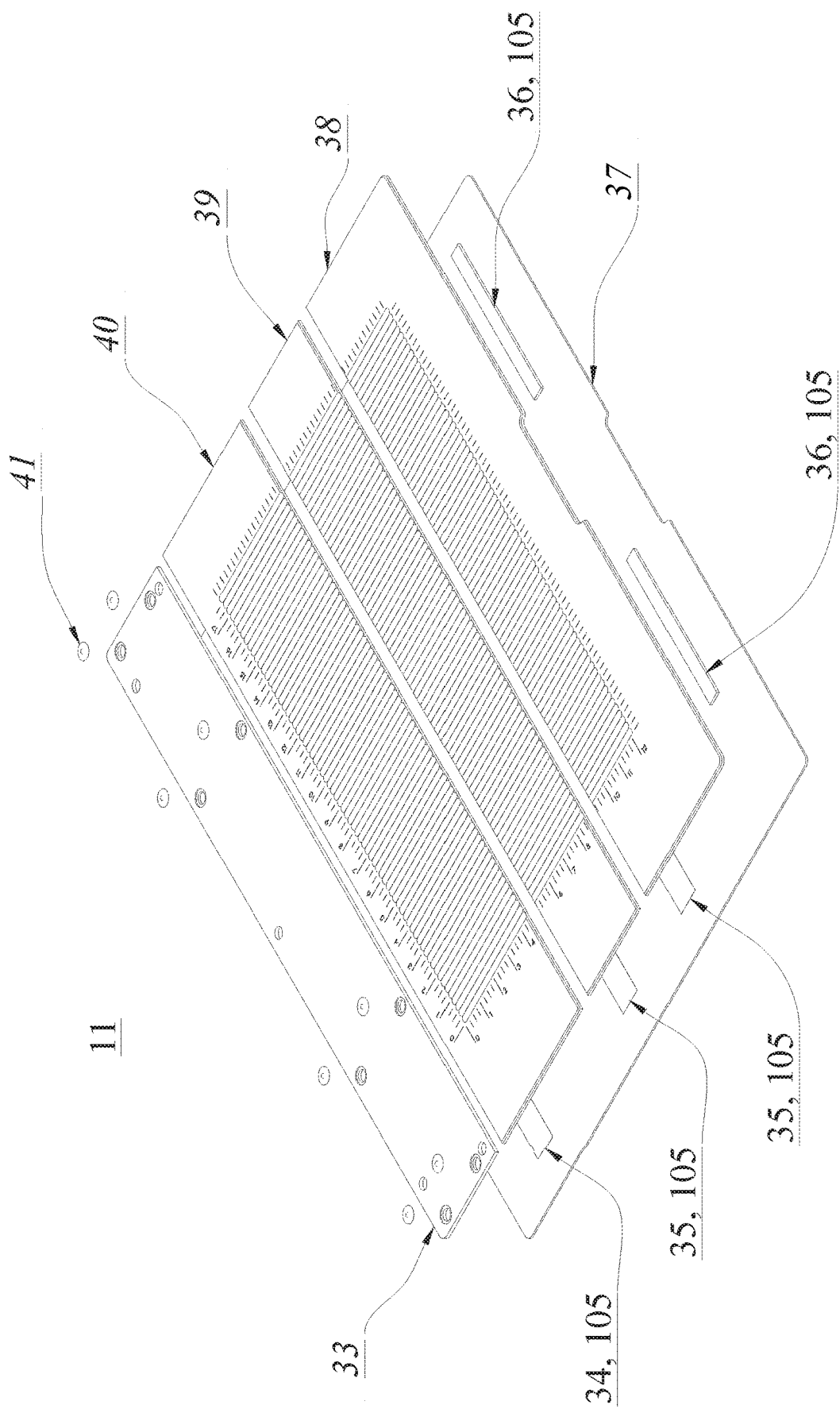
FIG. 17 is an exploded view of a cutting mat.

As can be seen in FIG. 17, the cutting mat 11 includes three layers, at least two of which do not extend through an entirety of the cutting mat 11.

The bottom layer 37 is intended to contact the surface on which the laser cutting machine 100 is operating. As illustrated, the bottom layer 37 covers the entire extent of the cutting mat 11, although portions could be omitted as dictated by design considerations. The bottom layer 37 may serve as a non-slip surface and/or as a protective surface so that the cutting mat 11 does not damage the surface upon which cutting mat 11 is placed. For example, if the bottom layer 37 is felt, then it is unlikely to damage surfaces like wood or glass when the cutting mat 11 is placed on such surfaces. Similarly, felt may act as a non-slip surface if the cutting mat 11 is placed on a textured surface (such as unfinished concrete).

The middle layer 105 of the cutting mat 11 includes three living hinges. Preferably, the living hinges are resistant to the laser beam if they are within an area of the cutting mat 11 toward which the laser beam can be directed. In the illustrated configuration, two of the living hinges are laser resistant living hinges 35 and the other living hinge is a non-laser resistant living hinge 34. The non-laser resistant living hinge 34 need not be laser resistant because it is outside of an area toward which the laser beam can be directed. In embodiments where the CNC machine is not a laser cutting machine 100, all of the living hinges may be non-laser resistant living hinges 34. Or all of the living hinges could be laser resistant living hinges 35 if, for example, commonality is desirable. One example of a laser resistant hinge is fabricated from 1075 brushed spring steel that is 0.004 inches thick. Another example of a laser resistant hinge is fabricated from carbon fiber. An example of a non-laser resistant living hinge is polypropylene sheet.

The middle layer also includes two magnets 36 that attach to corresponding magnets or ferrous material when the cutting mat 11 is folded around the upper body 7 and the lower body 8 (when the laser cutting machine 100 is in the folded condition).

The top-most layer includes different sections based upon their function. Three laser resistant sheets or plates 38, 39, 40 occupy the area of the cutting mat 11 toward which the laser beam can be directed, except for the spaces between that allow for the laser resistant living hinges 35 to bend. The laser resistant plates 38, 39, 40 may be made from any material that provides sufficient resistance to the laser beam. Exemplary materials include aluminum and steel, although aluminum (such as 6061 aluminum) may be preferable.

The laser resistant plates may include length markings (e.g., a ruler) engraved in or otherwise affixed to the surface to aid a user when locating material worked upon. One or both sets of the markings can be on or part of a surface that is raised relative to the rest of the cutting mat to form a straight edge that is raised relative to an adjacent portion of the flexible mat. Such an edge may be used to abut (and thus locate) a peripheral edge of material placed on the flexible mat. As will be evident from the figures, these rulers are parallel to the x-axis and the y-axis.

Figure 18:
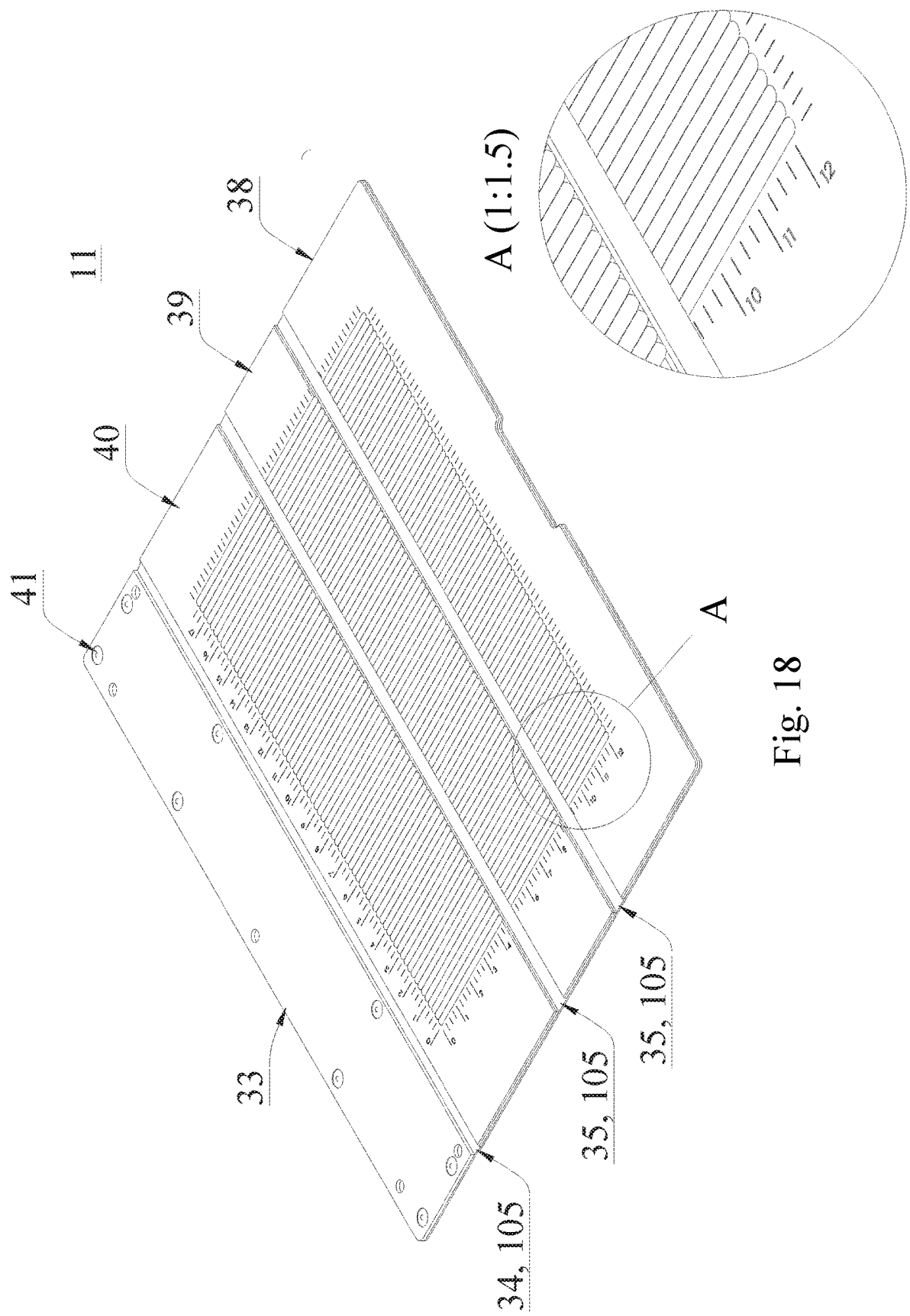
FIG. 18 is a perspective view of a cutting mat with an enlarged detail A.

The laser resistant plates may also include a surface finish that improves laser resistance. One such surface finish is illustrated in detail A of FIG. 18. The finish illustrated is best described as ridges or sharp peaked waves. With this surface finish, the contact area between the material being operated upon and the cutting mat 11 is reduced as compared to a flat surface. Such reduced surface area reduces heat transfer from the material being acted upon by the laser to the cutting mat 11. With reduced heat transfer, the cutting mat 11 is less likely to reach a temperature where the laser beam will cause damage. The surface finish will also result in most of the surface of the cutting mat 11 being farther away from the laser beam's focal point. This allows the energy to dissipate and/or be less focused before impinging on the cutting mat 11.

Another section of the top layer of the cutting mat 11 is a non-laser resistant plate 33. The non-laser resistant plate 33 is outside of the area of the cutting mat 11 toward which the laser beam can be directed and can therefore be made of a material such as acrylic. The non-laser resistant plate 33 underlies, and attaches to, the lower body 8. To facilitate attachment and removal, the non-laser resistant plate 33 can include recess that retain magnets 41. The magnets 41 can magnetically attach to corresponding magnets in the lower body 8.

Figure 6:
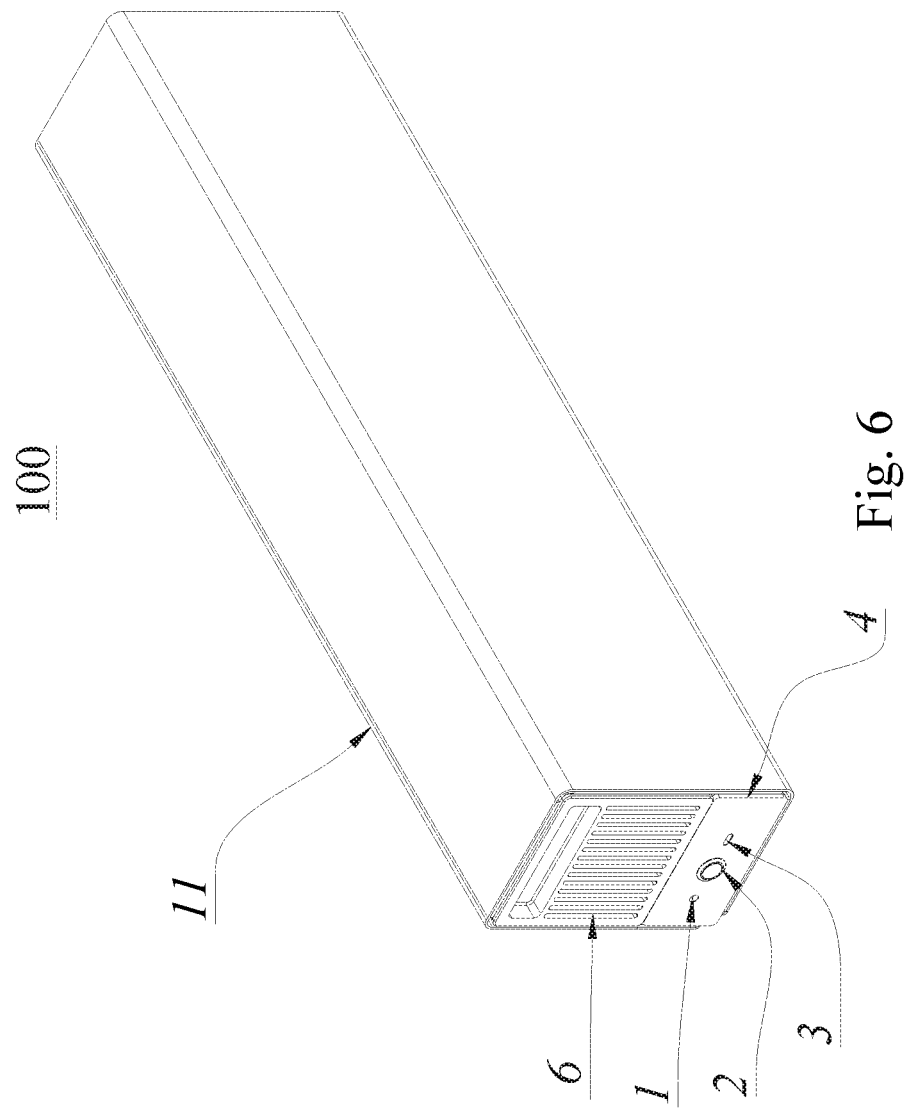
FIG. 6 is a perspective view of a laser cutting machine in a folded state.
Figure 7:
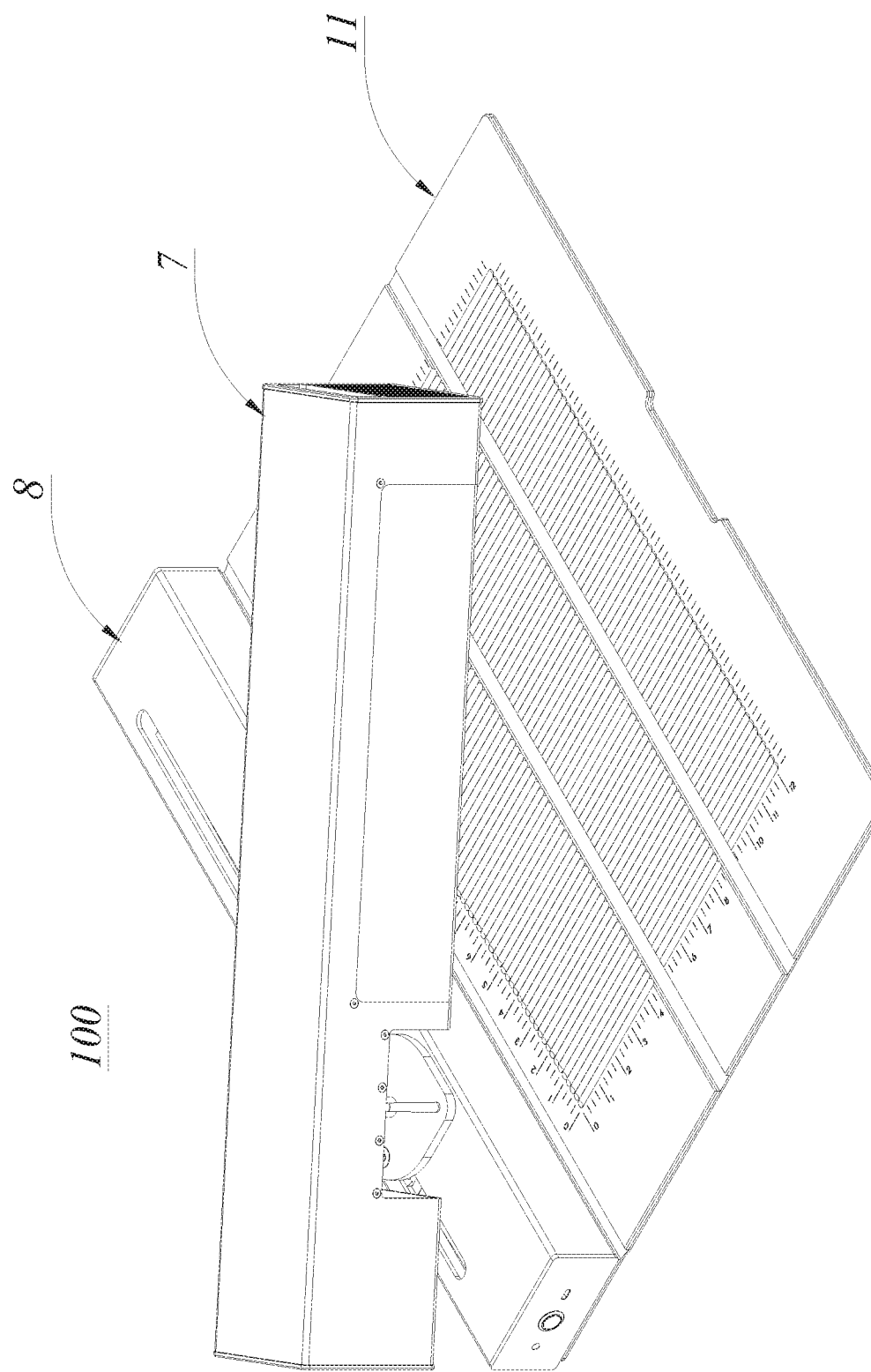
FIG. 7 is a perspective view of a laser cutting machine with an upper arm transitioning between a folded an unfolded state.
Figure 8:
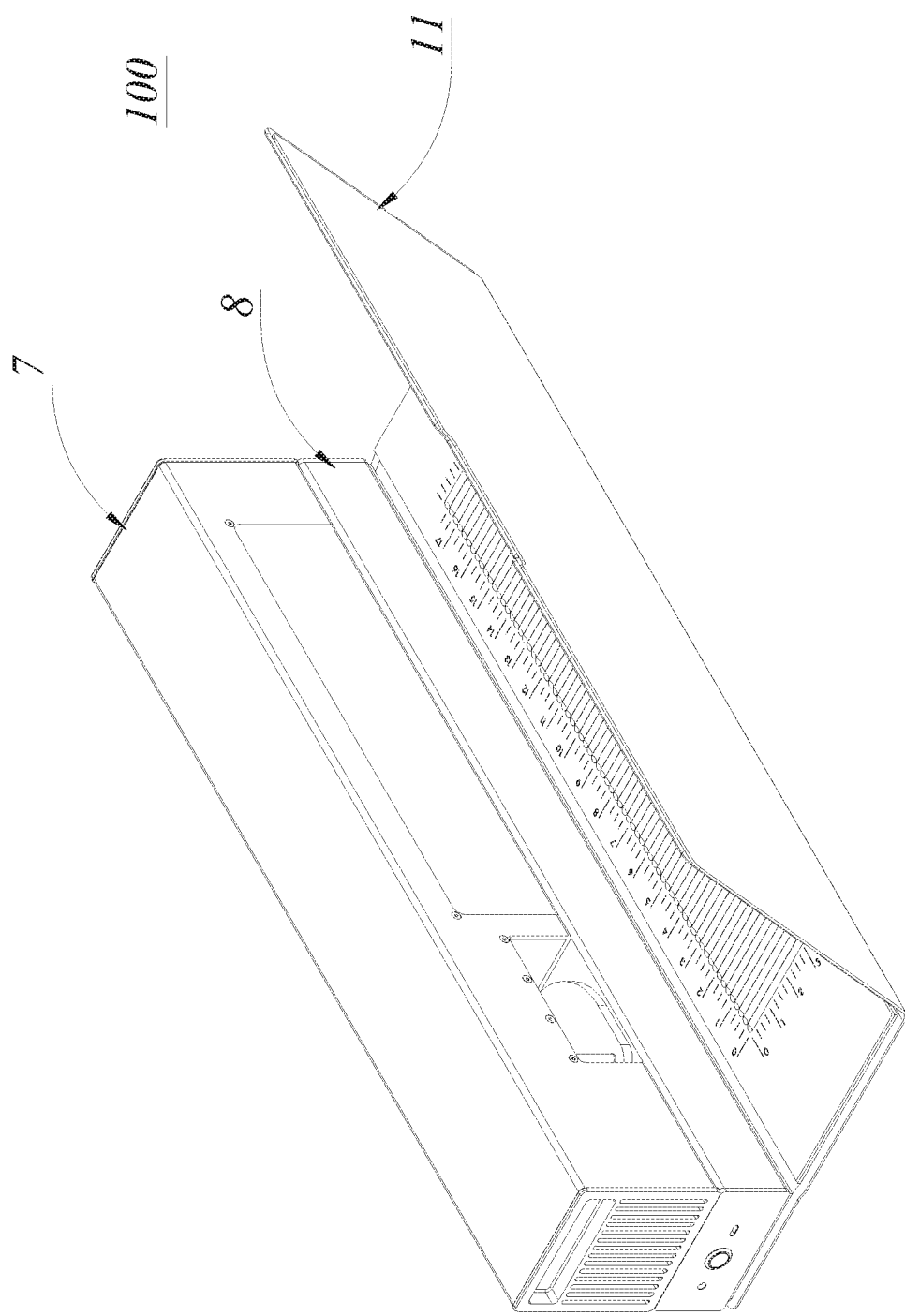
FIG. 8 is a perspective view of a laser cutting machine with a cutting mat in a partially folded state and an upper arm in a folded state.

All three layers of the cutting mat 11 are fastened together (e.g., laminated) to form a foldable and detachable cutting mat 11 that can be folded around the exterior of the laser cutting machine 100 when it is in a folded position, with the living hinges and plates together causing the hinges to bend along predetermined lines. FIG. 6 illustrates the cutting mat 11 folded around the laser cutting machine 100, which may help to secure the relative positions of the upper body 7 and the lower body 8. As will be appreciated from this figure, the number of living hinges and the distance between the living hinges will be dictated by the size and shape of the upper body 7 and the lower body 8 in their folded position. Similarly, the size and shape of the cutting mat 11 will be dictated by the unfolded, or working, position of the upper body 7 and the lower body 8, along with the extent of the range of motion of the laser module 17. FIG. 8 illustrates the upper body 7 and lower body 8 in the folded position and the cutting mat 11 in the process of being folded.

The cutting mat 11 as described may have advantages over the cutting bed of known laser cutting machines. For example, the cutting mat 11 provides functionality similar to a one foot thick cutting bed (which may include a one inch hexagonal extrusion with the remainder being open space below for dispersion of the laser beam) used in prior laser cutting devices, and does so with a convenient three layer laminate that can be less than 5 mm thick. The wave pattern grooves may improve the efficiency of the laser cutting process by reducing the amount of surface area in contact with the bottom of the material being cut, both reducing the thermal absorption of the cutting mat 11 and allowing the laser beam to pass through and dissipate. Other advantages will be apparent to those skilled in the art.

The cutting mat 11, the ability to fold the upper body 7 with respect to the lower body 8, and integration of filtration into the upper body 7 each individually contribute to making the laser cutting machine 100 smaller and more portable. Together, these three functions synergistically combine to make the laser cutting machine 100 even smaller and more portable. For example, the entire laser cutting machine 100 can be a tightly integrated system and any sub assembly would likely be less beneficial (with respect to space saving) without the inclusion of the others. The ability for the machine to transform is due, at least in part, to a relationship between the folding hinge and the folding bed. The hinge, when folded for storage aligns the vertical walls of the two bodies, ensuring that the panels of the cutting mat properly seat and fold over each face. This transformation allows the machine to be used in an environment where one previously did not have access to CNC technology, specifically laser cutting The laser cutting machine 100 can be used to cut or engrave material depending on factors such as the type of material, thickness of material, and dwell time and/or power of the laser beam. A user may create or obtain an image or vector file for controlling the laser cutting machine 100. This may be accomplished with a custom G-code generator or a commercially available software to convert an image file or vector file into G-code. A G-code sender may be used to send the G-code to an internal control board of the laser cutting machine 100. The laser cutting machine 100 then uses the G-code as information to move the motors to cause movement in the x and y directions and turn the laser on and off at specified times and power.

While the present technology has been described in connection with what is presently considered to be the most practical and preferred embodiments, it is to be understood that the present technology is not to be limited to the disclosed embodiments, but on the contrary, is intended to cover various modifications and equivalent arrangements included within the spirit and scope of the appended claims.

The invention claimed is:

1. A laser device comprising a lower body;
an upper body that extends from the lower body and is movably attached to the lower body;
a beam emitter that is movably attached to the upper body and is configured to generate a laser beam; and
a flexible mat that is attached to the lower body, wherein the flexible mat is resistant to the laser beam,
in at least one orientation of the flexible mat, an outer periphery of the flexible mat is greater than the full extent of range of motion of the beam emitter, and
the flexible mat is flat in a first configuration and at least partially wrapped around the lower body and the upper body in a second configuration.

2. The laser device according to claim 1, wherein the lower body comprises a magnetic element and the flexible mat is configured to magnetically attach to the magnetic element in the second configuration.

3. The laser device according to claim 1, wherein the flexible mat substantially conforms to one or more exterior surfaces of the lower body in the second configuration.

4. The laser device according to claim 1, wherein the flexible mat comprises a straight edge that is raised relative to an adjacent portion of the flexible mat and configured to abut a peripheral edge of material placed on the flexible mat.

5. The laser device according to claim 4, wherein the straight edge is parallel to a direction in which the upper body is movably attached to the lower body.

6. The laser device according to claim 1, wherein the flexible mat comprises a surface finish that reduces laser reflectance.

7. The laser device according to claim 1, wherein the flexible mat comprises hinges configured to allow the flexible mat to fold along a predetermined line.

8. The laser device according to claim 1, wherein the flexible mat comprises
a first layer with a plurality of adjacent sheets of laser resistant material, wherein the first layer is closest to the beam emitter in the at least one orientation; and
a second layer that is more flexible than the first layer, wherein the second layer connects each pair of adjacent sheets of laser resistant material together to form a living hinge.

9. The laser device according to claim 8, further comprising a third layer such that the second layer is sandwiched between the third layer and the first layer, the third layer being softer than the first layer and the second layer.

10. The laser device according to claim 9, wherein the third layer is felt.

11. The laser device according to claim 8, wherein the first layer is aluminum and the second layer is steel.

12. The laser device according to claim 8, wherein the first layer is steel and the second layer is carbon fiber.

13. The laser device according to claim 8, wherein the first layer comprises a surface finish that
reduces laser reflectance, and
reduces conductive heat transfer between the first layer and material placed on the first layer to be cut by the beam emitter.

14. The laser device according to claim 8, wherein the flexible mat comprises a sheet of flexible polymer connecting the flexible mat to the lower body.

* * * * *